Figure 1:
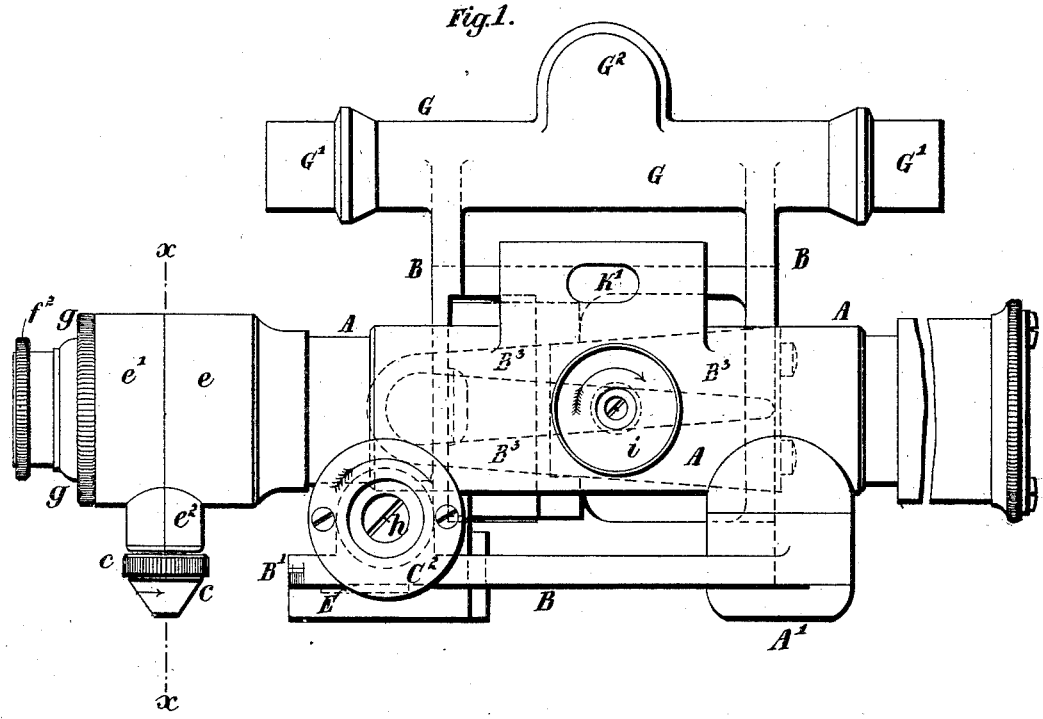

(No Model.)  4 Sheets—Sheet 1.

L. K. SCOTT.
TELESCOPIC SIGHT.

No. 428,962.  Patented May 27, 1890.

Witnesses:
J. A. Rutherford
Percy B. Hills

Inventor:
Lothian K. Scott.
By James L. Norris
Atty.

(No Model.) 4 Sheets—Sheet 2.
L. K. SCOTT.
TELESCOPIC SIGHT.

No. 428,962. Patented May 27, 1890.

Witnesses:
J. A. Rutherford
Percy B. Hills

Inventor:
Lothian K. Scott,
By James L. Norris
Atty.

(No Model.)　　　　　　　　　　　　　　　　　　4 Sheets—Sheet 3.
L. K. SCOTT.
TELESCOPIC SIGHT.
No. 428,962.　　　　　　　　　　　Patented May 27, 1890.
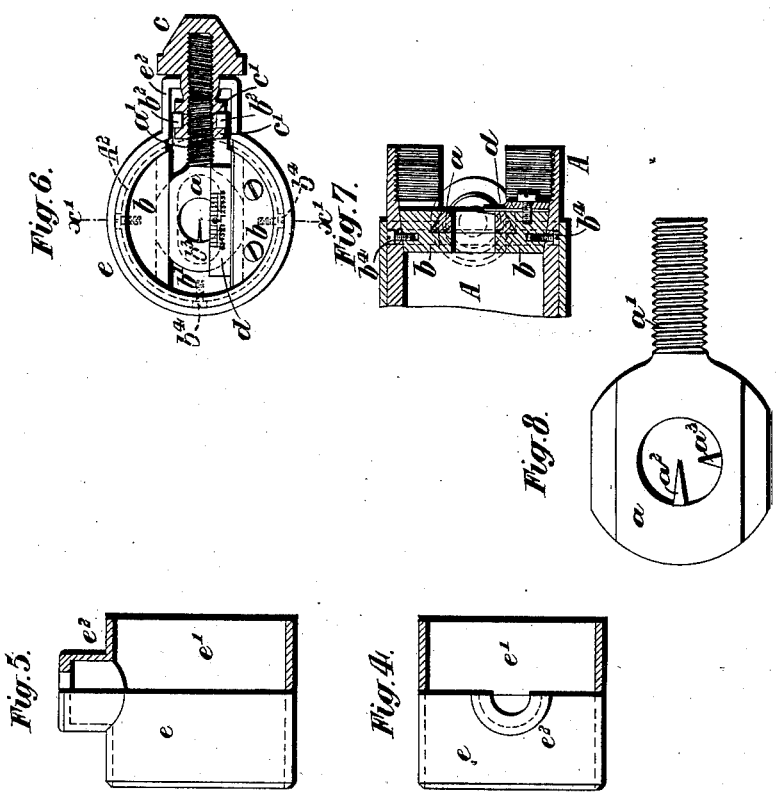

(No Model.)  
L. K. SCOTT.  
TELESCOPIC SIGHT.  
4 Sheets—Sheet 4.
No. 428,962. Patented May 27, 1890.
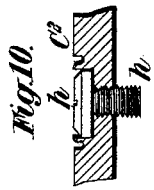
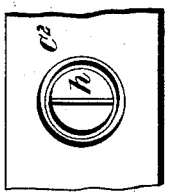
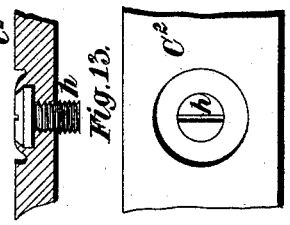
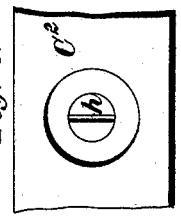
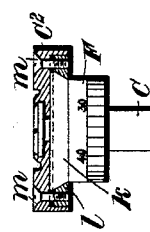
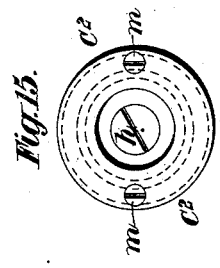
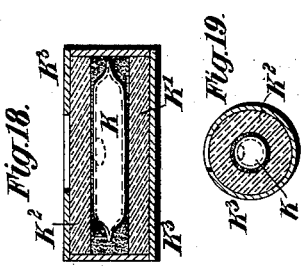
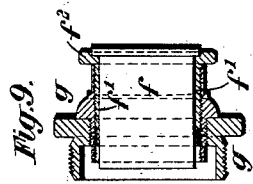

UNITED STATES PATENT OFFICE.

LOTHIAN KERR SCOTT, OF YORK TOWN, ENGLAND.

TELESCOPIC SIGHT.

SPECIFICATION forming part of Letters Patent No. 428,962, dated May 27, 1890.

Application filed March 14, 1889. Serial No. 303,354. (No model.) Patented in England November 18, 1881, No. 5,053.

*To all whom it may concern:*

Be it known that I, LOTHIAN KERR SCOTT, colonel Royal Engineers, a subject of the Queen of Great Britain, and a resident of York Town, England, have invented certain new and useful Improvements in Telescopic Sights, (for which I have obtained a patent in Great Britain, No. 5,053, dated November 18, 1881,) of which the following is a specification, reference being had to the accompanying drawings.

My invention relates to telescopic sights, chiefly designed for use on heavy guns or ordnance.

One feature of my said invention is the use of a diaphragm arranged to slide transversely to the longitudinal axis of the telescope, in combination with a graduated scale and index or pointer for the purpose of adjusting the sight, either for elevation or for lateral deflection, or both.

Another feature of my said invention is the combination, with the telescopic sight, of improved means for supporting it upon the gun in such a manner that the said sight is adjustable for the purpose of leveling it, and notwithstanding such adjustment the axis of revolution of the sight will always be parallel to the longitudinal axis of the gun. The means which I employ for effecting this object comprise suitable journals or trunnions attached to the telescope on one side thereof and adapted to rest in V-shaped or other bearings in a bracket attached to the gun, an adjusting-screw being inserted in the said bracket and bearing against a projection or lug on the telescope. By turning the said screw in one or the other direction the telescope can be caused to turn about the axis of the said journals or trunnions for the purpose of leveling it. The center of gravity of the mass being a considerable distance from the axis of the said journals or trunnions on one side thereof, it follows that when the said screw is turned in one direction the telescope will be caused to turn about the axis of the said journals or trunnions by gravity without the aid of a spring, and when the screw is turned in the reverse direction it will by its action upon the said projection or lug raise the said telescope.

My said invention, moreover, comprises various improvements, hereinafter described, in the details of construction.

Figure 2:
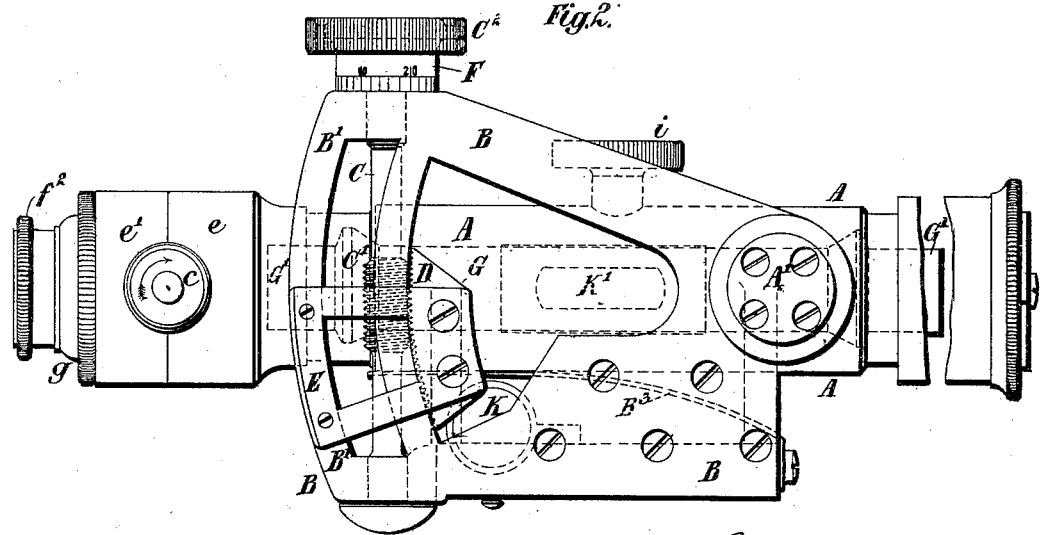
Figure 3:
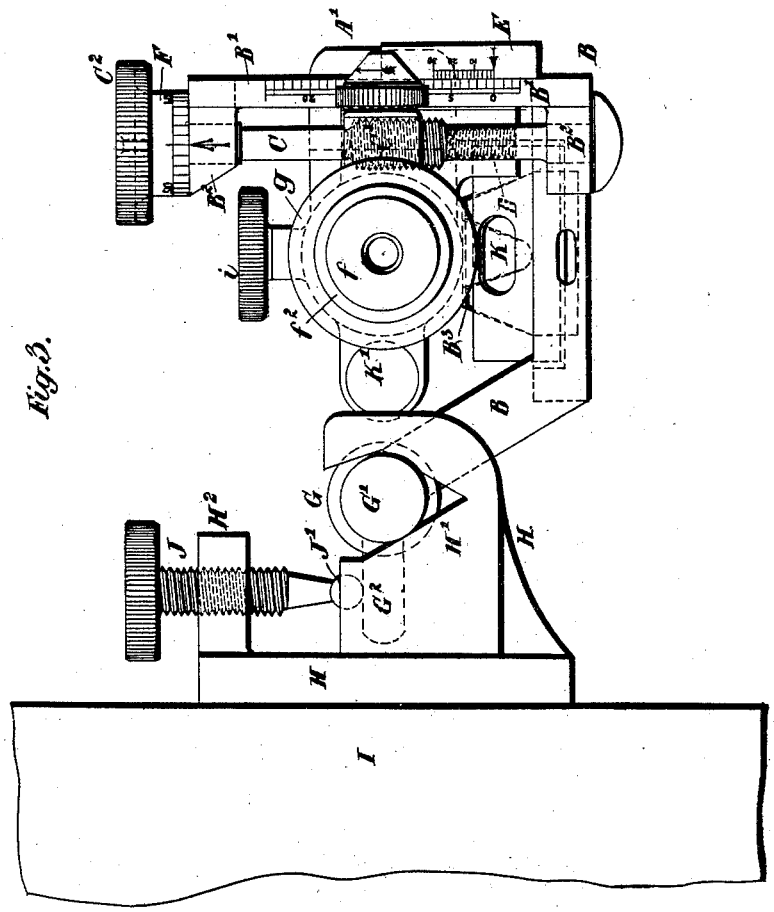

In the accompanying drawings, Figure 1 is a plan, Fig. 2 a side elevation, and Fig. 3 a rear elevation, of one form of my improved telescopic sight. Fig. 4 is a side elevation, partly in vertical central section; and Fig. 5 an under side view of a split or divided shield hereinafter described. Fig. 6 is a transverse section on the line $x\ x$, Fig. 1. Fig. 7 is a vertical central section on the line $x'\ x'$, Fig. 6. Fig. 8 is a view of the sliding diaphragm, drawn to a enlarged scale. Fig. 9 is a sectional side elevation of the adjustable eyepiece hereinafter described. The remaining figures, which are hereinafter referred to, illustrate details of construction.

A is the main tube or body of the telescope, which is pivoted at A' to a frame B. This frame is provided with a graduated arc B' and with bearings $B^2$, in which is fitted to rotate a shaft C, provided with a worm C'. The said worm is geared with a segment D of a worm-wheel, rigidly secured to the body A of the telescope. The body A also has rigidly secured thereto a vernier-scale or graduated arc E. The shaft C has fixed on its upper end a milled head $C^2$ and a collar F, forming a micrometer-scale. By these means the telescope can be turned about its pivot A' to adjust it to suit any desired angle of elevation.

The frame B extends beneath the telescope A, and has formed therewith or firmly attached thereto a shaft G, having at its extremities journals or trunnions G', and midway between its extremities a projection or lug $G^2$. A spring $B^3$ is, if desired, secured to the frame B, so that its free end bears against the under side of the telescope A, and obviates any liability to inaccuracy of adjustment of the sight by reason of slackness or backlash of the worm C'.

H is a bracket, which is firmly secured to one of the trunnions I of the gun, or it may be secured to any other suitable part of the gun. This bracket is provided with two V-shaped bearings H', adapted to receive the journals or trunnions G', and with a projection or lug $H^2$, having a tapped hole, in which is inserted an adjusting-screw J. This screw is formed with a spherical end J', which, when the telescopic sight is put into its place on the gun, bears against the projection or lug G², and thus holds up the telescope, which, being a considerable distance from the axis of the journals or trunnions G', would overbalance and turn about the said axis were such movement not prevented by the said screw J. By this arrangement I obviate the necessity for employing a spring to act in opposition to the said adjusting-screw. Moreover, I facilitate the attachment of the sight to a gun and its detachment therefrom, as the said sight can easily be inserted into and lifted out of its place in the bracket H without the necessity for manipulating or adjusting any screws or other securing devices. The bracket H and the trunnions G' are so constructed and arranged that the axis of the said trunnions will always be parallel to the longitudinal axis of the gun.

Suitable spirit-levels are provided at K and K' to facilitate the leveling of the sight.

Referring to Figs. 6, 7, and 8, $a$ is a sliding diaphragm, which is fitted in a dovetail groove $b'$ in the fixed or stationary diaphragm $b$. The diaphragm $a$ is provided with a screw-threaded stem $a'$, and is arranged to be moved to and fro at right angles to the longitudinal axis of the telescope by means of a nut $c$, endwise movement of which is prevented by projections $b^2$ on the diaphragm $b$, extending between collars $c'$ on the said nut. The nut $c$ is, however, free to be rotated by hand to effect the adjustment of the sliding diaphragm $a$. The said diaphragm $a$ is formed with a circular hole, as shown, and with an index or pointer $a^2$, which extends to the center of the said hole. The diaphragm $b$ is formed with an oblong or elongated hole $b^3$, so that the hole in the diaphragm $a$ will not be covered by the diaphragm $b$ when the former is moved to one or the other side of the axis of the telescope. The diaphragm $a$ is, moreover, provided with an index or pointer $a^3$, which extends upward from the lower edge of the hole in the said diaphragm in line with the center thereof. The diaphragm $b$ has attached thereto a graduated scale $d$, of horn or other suitable transparent or semi-transparent material. The index or pointer $a^3$ is arranged to indicate upon the said graduated scale the angular adjustment of the line of sight to allow for lateral deflection.

In some instances I use a vertically-sliding diaphragm and a vertical graduated scale, similar to those above described, for effecting the required adjustment for the vertical pointing or elevation, so that there is no necessity for moving the entire telescope to effect such adjustment, and the devices herein described for so moving the telescope may be dispensed with. In other instances I employ a sliding diaphragm, which is adjustable both vertically and horizontally for the purpose of effecting the required adjustment for elevation and for lateral deflection.

I prefer to make the aforesaid indexes or pointers of platinum or iridium to avoid the inconveniences arising from corrosion or oxidation of the said pointers.

It is evident that, if desired, the graduated scale may be attached to the moving diaphragm and the index or pointer therefor to the fixed diaphragm.

I secure the diaphragm $b$ in the tube A as follows, viz: I make the said diaphragm suitably tapered or conical and fit it to a corresponding seat in the tube A. I then secure it in place by means of screws $b^4$, the heads of which are let into a groove A² in the said tube.

I employ a split or divided shield or guard $e$ $e'$, the part $e$ of which is pushed over the end of the tube A before the diaphragm B is inserted and is then drawn back to cover the groove A² and the screws $b^4$. The part $e'$ of the shield or guard is placed upon the end of the tube A after the diaphragms have been inserted, and the two parts of the shield or guard then fit accurately together and are secured in place by means of screws or otherwise. The said shield or guard forms a very strong casing around the diaphragms, thus efficiently protecting the same against injury and excluding dust from the interior of the telescope. It is, moreover, formed with a lateral extension $e^2$, which serves as a bearing for the nut $c$.

The nut $c$ is in some instances marked with a micrometer-scale to facilitate accurate adjustment of the sliding diaphragm.

To provide for the focal adjustment of the telescope, I employ an adjustable eye-piece, constructed as follows—that is to say, the eye-piece proper, consisting of a tube $f$, Fig. 9, having suitable lenses secured therein, is fitted into a screw-threaded sleeve $f'$. This sleeve is fitted in a socket $g$, which is correspondingly screw-threaded internally, and which is secured in the rear end of the tube A. The sleeve $f'$ is provided with a flange $f^2$, having a milled edge, whereby it may be readily turned in one or the other direction to effect the longitudinal adjustment of the eye-piece. By this arrangement I provide for preventing accidental displacement of the eye-piece, notwithstanding rough handling of the telescope, and thus avoid the necessity for frequent readjustment of the eye-piece, such as is experienced when a sliding eye-piece is employed, which is liable to be easily displaced by endwise pressure. For securing the milled head C² upon the shaft C, I prefer to employ a screw $h$, which is countersunk in the said milled head, and the head of which screw is beveled, as shown in Figs. 10 and 12, and to prevent slackening and consequent loss of this screw, while permitting the tightening of the same when desired, I turn a circular groove in the milled head C², and thus leave a small ridge of metal around the head of the screw $h$, as shown in Figs. 10 and 11. I then force this metal inward or clinch it over the said screw-head, as shown in Figs. 12 and 13. I sometimes employ similar means for securing the milled head $i$ on its shaft for operating rack-and-pinion mechanism for extending and contracting the telescope.

I prefer to secure the micrometer-collar F to the milled head $C^2$, as hereinafter described, so that it can be accurately adjusted and will not be displaced in the operation of securing it to the said head—that is to say, I make the said collar with a conical head $k$, Fig. 14, which is adapted to enter a recess in the under side of the milled head $C^2$, and I provide a ring or annular piece $l$, which fits around the said conical head $k$, and is secured by screws $m$ to the milled head $C^2$, whereby when the said collar is adjusted by turning it until its zero-point coincides with an index engraved on the adjacent bracket $B^2$ the head $k$ is clamped tightly between the milled head $C^2$ and the annular piece $l$.

To provide for facilitating the accurate adjustment of the vernier-scale E relatively to the graduated arc B', I prefer to make the said vernier with an adjustable piece $n$, Figs. 16 and 17, which is secured to the main portion by screws $n'$, passed through slots $n^2$ in the said piece $n$. By this means, if the zero of the vernier-scale, after the instrument has been adjusted, is found not to coincide with the zero of the arc B', the screws $n'$ are slackened and the piece $n$ is shifted as required, and then again clamped in place by the said screws.

To obviate the liability to breakage of the spirit-levels employed, I prefer to construct the same as follows—that is to say, I place the thin glass vessel K, containing the spirit, in a thick glass tube or jacket $K^2$, Figs. 18 and 19, and secure it therein by means of suitable transparent cement. I then place the said jacket, with the thin glass vessel therein, in a metal casing $K^3$, formed on or attached to the telescope. The transverse spirit-level may, if desired, be secured to the top of the telescope. When, however, it is placed as shown in Figs. 1 to 3, it can be conveniently seen when the position of the sight on the gun is reversed, as hereinafter explained. The said spirit-level should be rigidly fixed at right angles to the axis of revolution of the sight, which axis of revolution must be parallel to the axis of the gun.

My improved telescopic sight is made reversible—that is to say, it is so constructed that it can be turned upside down and supported in the bracket H for the purpose of aiming to the rear. I prefer to so arrange the telescope that it is in or nearly in the same plane as the shaft G, and therefore the telescope will be at the same or nearly the same level relatively to the bracket H whether it is used for aiming to the front or to the rear.

It is evident that my improvements hereinbefore described are applicable to a sixty-degrees sight, suitable means being provided for effecting the required adjustment for the vertical pointing or elevation.

What I claim is—

1. In a gun-sight, the combination, with a frame provided with a graduated arc and adapted to be secured to a gun, of a telescope pivoted to said frame and provided with a worm-wheel and a graduated arc, and a micrometer-shaft having its bearings in said frame and provided with a worm to engage the worm-wheel on the telescope, substantially as described.

2. In a gun-sight, the combination, with a bracket adapted to be secured to a gun, of an adjustable frame having a shaft journaled in said bracket and provided between its ends with a lateral projection, a screw tapped into said bracket and bearing on the lateral projection of the said shaft to adjustably hold the frame, and a telescope pivoted to said frame and provided with micrometer-adjusting mechanism, substantially as described.

3. In a gun-sight, the combination, with an adjustable frame adapted to be secured to a gun, and a telescope pivoted to said frame and provided with a micrometer-adjusting mechanism, of a spirit-level supported on said frame, substantially as described.

4. In a gun-sight, the combination, with a frame adapted to be secured to a gun, and a telescope pivoted to said frame, of a sliding diaphragm located in the telescope-tube and provided with a graduated scale and an index or pointer, substantially as described.

5. In a gun-sight, the combination, with a gun and a telescope pivotally connected with the gun and having a sliding diaphragm, of an adjusting spindle or shaft provided with a milled head secured thereon by means of a conical-headed screw, the said screw being retained in place by clinching the metal of the milled head over the conical head of the screw, substantially as described.

6. In a gun-sight, the combination, with a gun, of a telescope having a sliding diaphragm and provided at one side thereof with journals or trunnions the axis of which is parallel to the longitudinal axis of the telescope at zero elevation and deflection, the said journals or trunnions being so arranged that the sight is reversible, substantially as described.

7. In a gun-sight, the combination, with a gun, of a telescope pivotally connected with the gun and having fixed and sliding diaphragms and a split or divided shield or guard secured in place around said diaphragms, substantially as described.

8. In a gun-sight, the combination, with a gun and a telescope pivotally connected with the gun and provided with a fixed diaphragm, of a diaphragm arranged to slide thereon transversely to the axis of the telescope and provided with a screw-threaded stem and a nut screwed upon the said stem and held between projections on the said fixed diaphragm, substantially as described.

9. In a gun-sight, the combination, with a telescope pivotally connected with a gun, of a sliding diaphragm having a screw-threaded stem and a nut fitting on the said stem and provided with a micrometer-scale, substantially as described.

10. In a gun-sight, the combination, with a telescope pivotally connected with a gun and having a conical seat in the main tube of the telescope, of a conical or taper diaphragm fitted to the said seat and firmly secured in place by screws the heads of which are let into a groove in the said tube, substantially as described.

11. In a gun-sight, the combination, with a gun and a pivoted telescope provided with a sliding diaphragm, and a shaft having a milled head and provided with a worm for adjusting the telescope, of a micrometer-collar provided with a conical head and a clamping-ring or annular piece for securing the said collar to the milled head, substantially as described.

12. In a gun-sight, the combination, with a gun, of a telescope pivotally connected with the gun and provided with a sliding diaphragm, and a vernier-scale attached to the telescope and adjustable relatively thereto, substantially as described.

13. In a gun-sight, the combination, with a gun and a telescope adjustably connected with the gun and provided with a sliding diaphragm, of a spirit-level provided with a glass jacket and inclosed in a metal casing, substantially as described.

14. In a gun-sight, the combination, with a bracket adapted to be secured to a gun, of an adjustable frame having a shaft journaled in said bracket and provided between its ends with a lateral projection, a screw tapped into said bracket and bearing on the lateral projection of the said shaft to adjustably hold the frame, and a telescope pivoted to said frame, substantially as described.

15. In a gun-sight, the combination, with a frame pivoted to the gun and provided with means for adjusting it, and with a graduated arc, of a telescope pivoted to said frame and provided with a worm-wheel and a graduated arc, and a micrometer-shaft having its bearings in said frame and provided with a worm to engage the worm-wheel on the telescope, substantially as described.

16. In a gun-sight, the combination, with an adjustable frame adapted to be secured to a gun, of a telescope pivoted to said frame, and a spirit-level attached to the said telescope, substantially as described.

In testimony whereof I have hereunto signed my name in the presence of two subscribing witnesses.

LOTHIAN KERR SCOTT.

Witnesses:
DAVID YOUNG,
FRANK BAISLEY.